(12) United States Patent
Niedzwiecki

(10) Patent No.: US 7,570,200 B2
(45) Date of Patent: Aug. 4, 2009

(54) STEPPED FREQUENCY RADAR

(75) Inventor: Joshua D. Niedzwiecki, Manchester, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 241 days.

(21) Appl. No.: 11/632,027

(22) PCT Filed: Jan. 12, 2006

(86) PCT No.: PCT/US2006/001075

§ 371 (c)(1),
(2), (4) Date: Jan. 9, 2007

(87) PCT Pub. No.: WO2006/076488

PCT Pub. Date: Jul. 20, 2006

(65) Prior Publication Data

US 2008/0068256 A1    Mar. 20, 2008

Related U.S. Application Data

(60) Provisional application No. 60/643,542, filed on Jan. 13, 2005.

(51) Int. Cl.
*G01S 13/06* (2006.01)
(52) U.S. Cl. .................... 342/146; 342/175; 342/196

(58) Field of Classification Search ............... 342/90, 342/129, 130, 131, 128, 175, 192, 195, 196, 342/146; 324/629, 637, 642, 646
See application file for complete search history.

(56) References Cited

U.S. PATENT DOCUMENTS

| | | | |
|---|---|---|---|
| 3,378,844 A | | 4/1968 | Zurcher |
| 4,492,960 A | | 1/1985 | Hislop |
| 4,725,842 A | | 2/1988 | Mayberry |
| 4,857,935 A | | 8/1989 | Bates |
| 5,153,596 A | | 10/1992 | Stove |
| 5,587,713 A | * | 12/1996 | Pfizenmaier et al. .......... 342/70 |
| 5,610,611 A | | 3/1997 | McEwan |
| 5,910,785 A | | 6/1999 | Normant |
| 5,952,955 A | | 9/1999 | Kennedy et al. |
| 6,072,419 A | | 6/2000 | Normant |
| 6,195,035 B1 | | 2/2001 | Wood |

* cited by examiner

*Primary Examiner*—Isam Alsomiri
(74) *Attorney, Agent, or Firm*—Robert K. Tendler; Daniel J. Long

(57) ABSTRACT

In the invention, a four-port junction (10) has a port (12) connected to an RF signal source (14). The four-port junction (10) also has an antenna port (16) coupled to a combined transmit/receive antenna (18). Two ports (20, 22) of the four-port junction (10) develop output power that is applied to an analogue-to-digital converter (24), that is in turn coupled to a central processor (26), that is in turn coupled to a user interface (28).

12 Claims, 4 Drawing Sheets

STEPPED FREQUENCY RADAR

RELATED APPLICATIONS

This application claims rights under 35USC119(e) from U.S. Patent Application Ser. No. 60/643,542, filed Jan. 13, 2005, the contents of which are incorporated herein by reference. This Application is related to U.S. application Ser. No. 11/110,263 filed Apr. 20, 2005, and U.S. patent application Ser. No. 11/035,311 filed Jan. 13, 2005, the contents of both are incorporated herein by reference.

FIELD OF THE INVENTION

This invention relates to stepped frequency radars and more particularly to the use of multi-port junctions in combination with circuits for estimating a complex reflection coefficient to provide radar functions.

BACKGROUND OF THE INVENTION

As described in the aforesaid U.S. application Ser. No. 11/110,263 by Matthew A. Taylor, Kevin S. Bassett, and Paul E. Gili, entitled "Method and Apparatus For Transmission Line and Waveguide Testing", and Ser. No. 11/035,311 by Joshua Niedzwiecki, entitled: "Reduced Complexity Transmission Line And Waveguide Fault Tester", both assigned to the assignee hereof and incorporated herein by reference, multi-port junctions are used in combination with a module for generating a complex reflection coefficient from the outputs of the multi-port junction in order to establish in one embodiment the existence of faults in a transmission line and the severity thereof. In these applications, a reflectometer having a frequency source that is stepped from one frequency band to the next provides a complex reflection coefficient profile with frequency for each of the faults or discontinuities in the transmission line.

When the estimated complex reflection coefficient is processed by an Inverse Fourier Transform, then the frequency domain information is converted to time domain information. The time domain information is then converted to distance to a fault or range to a fault in the transmission line.

Algorithms described in the Taylor patent application and in the Niedzwiecki patent application include various algorithms for estimating complex reflection coefficients from respectively a six-port junction and a four-port junction in which the output signals from the multi-port junctions are functions of both the signal source and the returned reflected signal.

It will be appreciated that when multi-port junctions are utilized for reflectometers, gone are the usual IF stages, heterodyning, mixers and oscillators which are in general used to convert received signals to base band where the processing occurs.

The same heterodyning techniques are used in current stepped frequency radars in which received signals are down-converted by an intermediate IF stage to an IF frequency. The result of the down-conversion is then digitally sampled to bring it down to base band where one is able to examine the differences between what is transmitted and what is reflected.

The problem with such stepped frequency radars is the cost of such IF stages, which include expensive oscillators and mixers.

By way of further background, frequency-swept radars have been used as ground penetrating radars in which subsurface objects are to be identified, such as land mines, pipes, voids in concrete and other subterranean objects. There are a wide variety of time domain reflectometers and systems that develop their information by ascertaining the range to the discontinuity by detecting, for instance, round trip travel times.

Where there are a number of ultra wideband ground penetrating radars that use swept frequencies, their resolution and the ability to identify subsurface objects leaves something to be desired. Others have suggested using pulsed radars as ground penetrating radars. The problem with such ground penetrating radars or through-the-wall radars that use pulse techniques is that, as one gets higher in frequency, one cannot adequately control the leading and trailing edges of the pulses so that high fidelity resolution is not possible.

It would be desirable to have a high fidelity frequency resolution in which a high fidelity map of the reflection coefficient of the returned energy across frequency is determined. However, if one were to attempt to use time domain reflectometry techniques for a ground penetrating radar, one can only achieve limited fidelity to, for instance, fully characterize the frequency response of the reflecting objects.

It is therefore impossible utilizing traditional time domain reflectometers to obtain a high fidelity radar map of the reflection coefficients across frequency.

While stepped frequency radars have been used in the past that are frequency agile, it is important to be able to ascertain with high fidelity what is happening in the main lobe of the radar using sensitive techniques that require phase coherence of the radar itself. How one accomplishes frequency stepping while maintaining phase coherence is indeed a problem and one that heretofore has required expensive equipment to be able to generate phase-coherent transmitted radiation and to be able to analyze the returns based upon samples of the transmitted radiation.

Moreover, in the past and as described in U.S. patent application Ser. No. PCT/US04/20116 by Paul Zemany entitled Dual Frequency Through-the-wall Motion Detection and Ranging Using Difference-Based Estimation Technique, filed Sep. 14, 2004, assigned to the assignee hereof and incorporated herein by reference, two-color radars have been used to be able to detect motion of individuals behind a wall in a so-called through-the-wall system. In this system, CW signals of two alternating different frequencies are used to detect the presence of moving individuals behind a wall. Moreover, when multiple frequency bands are available, one is able to locate not only the fact of a moving individual, but also the location of the moving individual. Moreover, when more and more radars surround, for instance, a building, one can triangulate to more accurately estimate the position of the individual. One therefore needs an inexpensive frequency-stepped CW radar for these applications.

Such through-the-wall systems are extremely useful for fire and police for commercial applications as well as for the military to be able to detect enemy combatants or soldiers behind a wall or within a building.

As will be appreciated, several through-the-wall applications require frequency-stepped radars and for this reason one would like to develop a relatively inexpensive, simplified frequency-stepped radar for these purposes.

SUMMARY OF INVENTION

It has been found that one can use the aforementioned frequency domain reflectometers of Matthew A. Taylor and Joshua D. Niedzwiecki to ascertain the complex reflection coefficient, not of a transmission line but rather of anything that is within an antenna beam when, rather than coupling a transmission line to a test port of a reflectometer using a multi-port junction, one attaches an antenna.

As described in the aforementioned Taylor and Niedzwiecki inventions, one can estimate the complex reflection coefficient as a function of frequency and thereby obtain a reflection coefficient frequency profile. Further, one can use the complex reflection coefficient profile to derive distance to the reflections, thereby to provide range information.

It has been found that one can use the complex reflection coefficient profile that results through the use of a multi-port junction fed by a variable-frequency signal source to obtain frequency profiles at various frequencies which, when compared with pre-stored profiles, enable one to identify the object reflecting the transmitted signal.

The stepped-frequency radar can use a single antenna for transmitting out a CW radar beam and for receiving the returns, or can be adapted to a situation in which one antenna transmits the beam and a co-located antenna receives the returns. In this latter case, since the received signals are a great deal lower in amplitude as compared with the transmitted signal, one need not have a high power multi-junction circuit at the receive side. This decreases the cost of the overall system, since one can use low-power multi-port junctions.

In a still further embodiment of the invention, one can use these multi-port junctions at each antenna or pair of antennas in an array. This permits the rendering of a three-dimensional map of the objects reflecting the energy, along with an identification of what the objects are.

In either case, a variable frequency signal source is connected to one port of a multi-port junction, with the other port of the multi-port junction coupled to an antenna to transmit out at least a portion of the signal source output. Because of the use of the multi-port junction, a portion of the transmitted signal is mixed with a portion of the received signal and with appropriate processing results in the aforementioned complex reflection coefficient frequency profile.

As will be appreciated, the stepped frequency radar can operate with a low-cost RF source that does not contain any mixing circuitry or high-speed sampling circuitry that can be very costly and can limit performance.

The stepped-frequency approach of the subject invention also allows for accurate spectral characterization of whatever is in the field of view of the transmit antenna. Moreover, the bandwidth of the frequency sweep is variable so that the depth resolution can be easily adjusted for each application with no increase in system cost. With a pulse radar system, this can only be achieved by using very short-duration impulses or very sharp pulse edges that require expensive, high-performance signal sources and high-speed data acquisition circuits. Even so, adequate performance above 1 GHz is problematical. Thus, in certain instances, for instance at 18 GHz, the required ultra-short pulses are impossible to generate.

Moreover, when the antennas are arrayed, the subject invention permits obtaining high spatial resolution through beam forming. In this application, the radar design is implemented in an array-based system where multiple transmit and receive antennas are arrayed.

As mentioned above, the invention is capable of operating with separate transmit and receive antennas, although it can also combine the transmit and receive functions into the same antenna to improve performance and reduce cost.

Note that in the beam-forming applications the beam may be electronically steered using digitally controlled phase shifters so that the radar can scan a given field of view. Moreover, with specialized signal processing algorithms, one can use the subject system to adaptively track a specific location of interest, for instance, where there is a buried object. This enables the signal-processing algorithm not only to locate each object but also to examine the details of each object with the highest signal-to-noise ratio possible.

As will be appreciated, this technique can be used to locate buried objects that can be easily detected and characterized using the complex reflection coefficient and the subject processing algorithms.

Thus, because the subject invention can be implemented at low cost while maintaining high performance, it lends itself to many applications. One application is the aforementioned ground penetrating radar application. In this case, underground objects such as land mines, tunnels or pipes, can be detected with a high degree of accuracy. Structural analysis can be performed by examining the internal components of the structure. For example, concrete foundations are often examined using ground-penetrating radar to examine the location and structure of the rebar and to detect any pockets that may cause stress. Another application for the subject invention is to use it for the above-mentioned through-the-wall radar, which can be used by police or the military to ascertain if people are in a building or behind a wall.

Rather than attempting to use time domain reflectometers for such purpose, the subject frequency domain reflectometer operation permits better resolution and better ability to identify different features of reflecting objects.

In one embodiment, the subject invention uses a bank of microwave detector circuits, each connected to an antenna and each being fed by a single RF signal source. In one embodiment these detector circuits are four-port junctions, with each four-port junction having two outputs containing two orthogonal RF signals that are functions of both the source signal and the returned signal.

These outputs are coupled to power detector circuits, where the power output of each is measured over a fixed period of time. The process is repeated for each frequency in a sweep, with the output power measurements amplified and sampled by an analog-to-digital converter and then processed by a signal processor to obtain the aforementioned complex reflection coefficient profile.

The processor uses the sample power measurements out of each detector circuit and specialized signal processing algorithms to estimate the complex reflection coefficient, $S_{11}(f)$, as seen from each antenna for each frequency step in the sweep.

This reflection coefficient, also known as the two-way propagation coefficient, $S_{21}(f)$, defines how each signal is attenuated and phase shifted for each frequency step.

Once the stepped process is complete, a transfer function of the propagation medium is defined as a function of frequency. Signal processing algorithms are then use to process this spectral response in space, time and frequency domain to detect and classify buried objects.

In one embodiment, what is provided is a so-called single element four-port-based radar with a single transmit/receive antenna. Here a portion of a frequency-stepped RF signal from a signal source is coupled out of the antenna and received reflections are passed through a number of 90° quadrature hybrids as well as a 0° splitter to provide the above-mentioned outputs. These two outputs are then used to estimate the complex reflection coefficient.

In the second embodiment, the RF signal source is directly coupled to a transmit antenna, which is located adjacent a receive antenna. In this embodiment, a portion of the RF signal source is divided down or split and is combined with the reflected energy returned to a receive antenna from objects within the transmit beam of the transmit antenna. The purpose of this embodiment is so that a maximum amount of transmit power can be radiated, while the multi-port junction used in generating the complex reflection coefficient need not be a high-power device and therefore inexpensive.

In a third embodiment in which the transmit and receive antennas are the same antenna, an array of such antennas can be provided in which a multi-port junction is provided for each transmit/receive antenna. Digital phase shifters may be used between the RF source and each of the multi-port junctions associated with each transmit/receive antenna so as to provide beam-forming functions.

In summary, a multi-port junction is fed with a frequency-stepped source and has one of its ports connected to an antenna that can serve either as a transmit-and-receive antenna or as a receive antenna only, with the outputs of the multi-port junction being used to estimate a complex reflection coefficient for each frequency of interest. The subject system requires no IF stages, down-conversion mixers or oscillators, and therefore may be provided adjacent each antenna at low cost. An embodiment involving co-located separate transmit and receive antennas is used to minimize the power requirements for the multi-port junction, whereas in a third embodiment, an array of transmit/receive antennas is used, fed by the same RF source but in which digitally-controlled phase shifters are used for beam-forming purposes.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
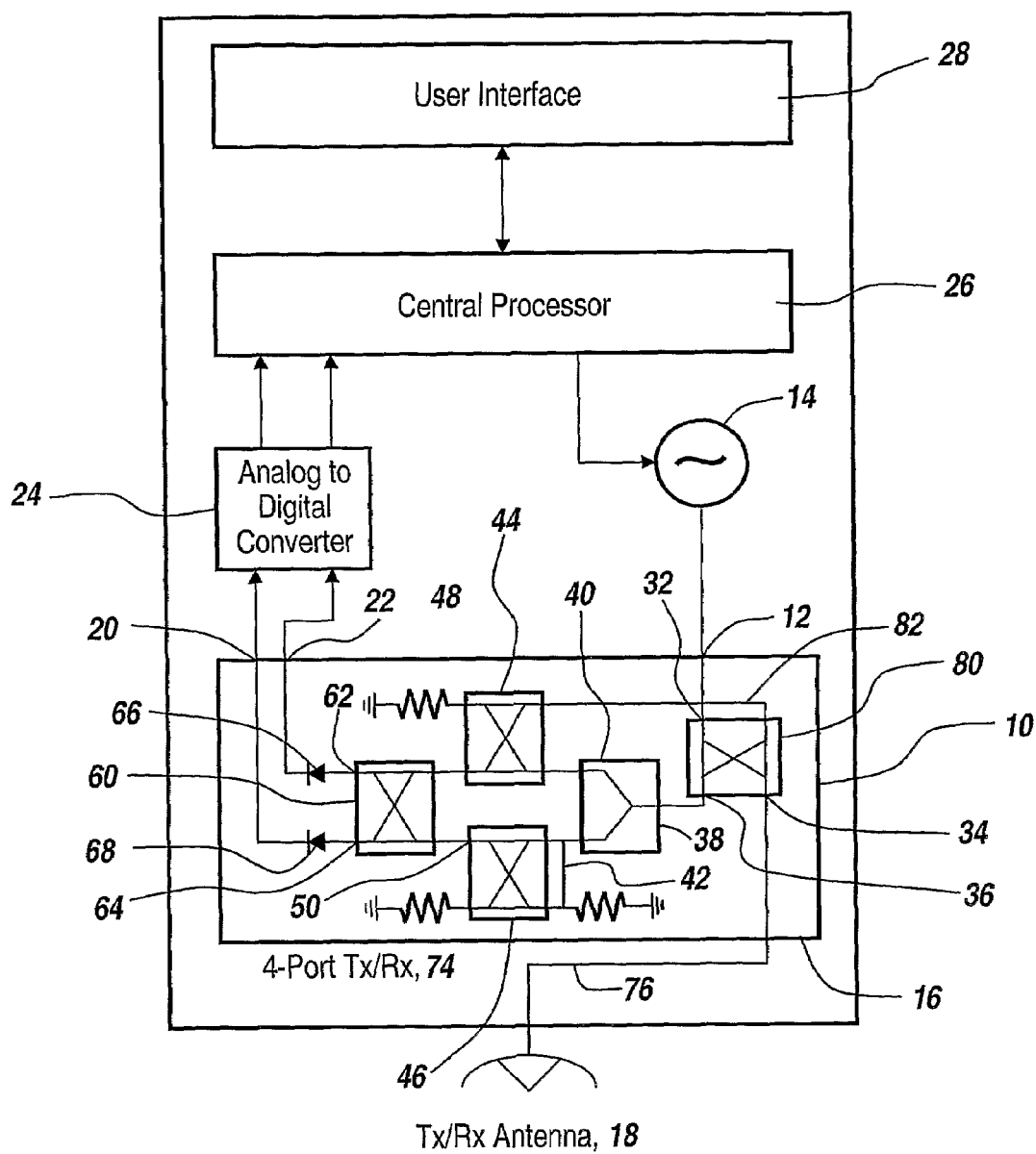
FIG. 1 is a diagrammatic illustration of a single-element, four-port-based radar, illustrating the use of the four-port junction fed by an inexpensive frequency-swept RF signal source having one of its ports coupled to a transmit/receive antenna, with the output of the four-port junction being used to generate a complex reflection coefficient frequency profile useful in identifying the range and characteristics of a reflecting object.

Referring now to FIG. 1, in one embodiment of the subject invention, a four-port junction 10 has a port 12 connected to an RF signal source 14. Four-port junction 10 also has an antenna port 16 coupled to a combine transmit/receive antenna 18 as illustrated.

There are two output ports 20 and 22 at which output power is developed, which is applied to an analog-to-digital converter 24, in turn coupled to a central processor 26 that is in turn coupled to a user interface 28.

Four-port junction 10 includes a 90° quadrature hybrid 30, which has an input port 32 coupled to port 12 and an input port 34 coupled to port 16. Hybrid 30 also has an output port 36 coupled to a 0° power divider 38 that has output ports 40 and 42 coupled to respective 90° quadrature hybrids 44 and 46. The outputs of respective hybrids 44 and 46, namely ports 48 and 50, are coupled to the input ports to a 90° quadrature hybrid 60 having output ports 62 and 64 coupled to power detectors 66 and 68 that are in turn coupled to output ports 20 and 22. Note that hybrid 44 has an output port 70 coupled to ground through a load 72, whereas hybrid 46 has ports 74 and 76 coupled to respective loads 78 and 80 to ground.

In operation, an RF source signal at port 12 is coupled through hybrid 30 to port 16 and thence to transmit/receive antenna 18. Antenna 18 receives reflected energy from an object in the lobe of the antenna and couples this reflected energy back into port 34, where it is transmitted to hybrid 44 over line 82. Hybrid 44 then couples a portion of this reflected energy to hybrid 60, along with a divided-down portion of the RF source signal that comes from divider 38.

What is therefore available at power detectors 66 and 68 is a portion of the RF signal source mixed with a portion of the reflected signal.

Because of divider 38, a portion of the RF signal source passes through hybrid 46 and then to hybrid 60, where it appears in the output of power detector 68. Hybrid 60 mixes the divided-down output of the RF source with a portion of the reflected signal that is available from hybrid 66.

What is therefore available at the outputs of power detectors 66 and 68 are 90°-out-of-phase signals that can be used, after analog-to-digital conversion, by the central processor to calculate the complex reflection coefficient for the particular frequency to which the RF source is tuned.

Central processor 26 computes from the complex reflection coefficient at least the range to the reflecting object and indeed other spectral characteristics of the reflecting object, such that user interface 28 can be used to develop a three-dimensional map of the area surveyed by the radar.

What makes this a stepped-frequency radar is the fact that the RF signal source is stepped in frequency over a number of frequency bands and frequencies so that, as will be described, a complex reflection coefficient profile can be generated as a function of frequency.

The above describes the use of a stepped-frequency radar in which a single transmit/receive antenna is used.

Figure 2:
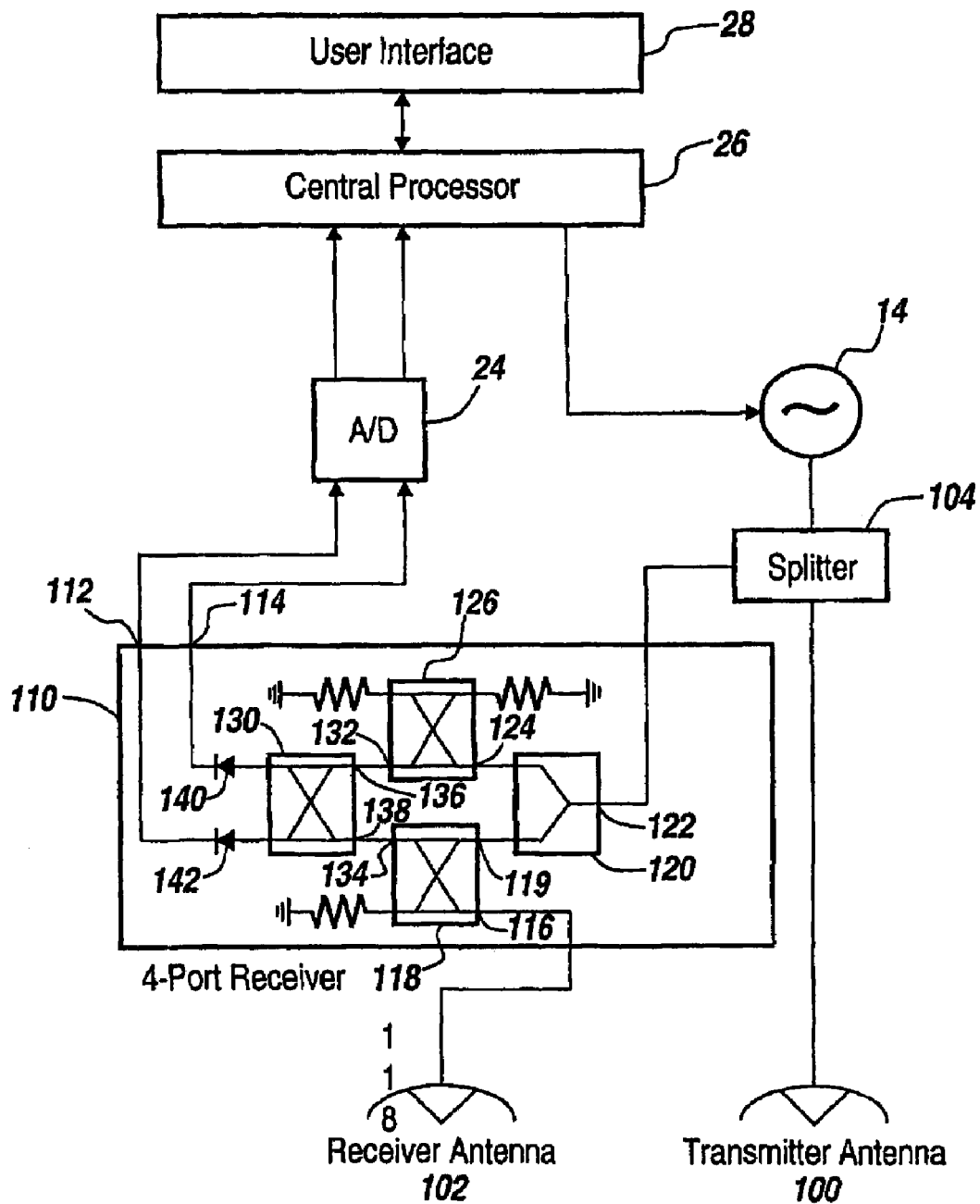
FIG. 2 is a diagrammatic illustration of an embodiment involving a separate transmit antenna and receive antenna, illustrating that rather than feeding the transmit antenna through the multi-port junction, a separate transmit antenna is used, with the receive antenna being coupled to an inexpensive multi-port junction.

Referring now to FIG. 2, a situation is presented in which a transmit antenna 100 is used in combination with a co-located receive antenna 102.

Here, a splitter 104 splits off a small portion of the signal from RF source 14 and applies it to a different type of four-port junction 110, which has output ports 112 and 114 coupled to analog-to-digital converter 24 to permit central processor 26 to derive the complex reflection coefficient from these outputs.

What will be seen is that the reflected energy is collected at receive antenna 102, where it is coupled to port 116 of a 90° hybrid 118, where it is mixed with a divided-down RF source signal at port 119 from a 0° power divider 120 having its input port 122 connected to splitter 104. The other portion of the divided-down output from splitter 120 is applied to an input port 124 of a 90° quadrature hybrid 126, with the outputs of hybrids 118 and 126 being applied to a further 90° quadrature hybrid 130.

Here it will be seen that respective hybrids 126 and 118 have outputs 132 and 134 coupled to inputs 136 and 138 of hybrid 130. Moreover, the outputs of hybrid 130 are connected to power detectors 140 and 142 connected respectively to ports 112 and 114 as illustrated.

Here it will be seen that the majority of the energy from the RF source is coupled by splitter 104 to transmit antenna 100. Only a small portion of the energy from RF source 14 is coupled to four-port junction 110 so that the reduced power signal exists at port 122 of splitter 120.

What will be appreciated is that since the energy that enters port 122 of four-port junction 110 is a much-divided-down portion of the RF source, then the four-port junction need not be provided with any heavy current-carrying capability and therefore can be made relatively inexpensively.

As in the case of FIG. 1, the output power available at output ports 112 and 114 are 90° out of phase, with portions of the RF signal source and the reflected energy available at the outputs of these power detectors.

Figure 3:
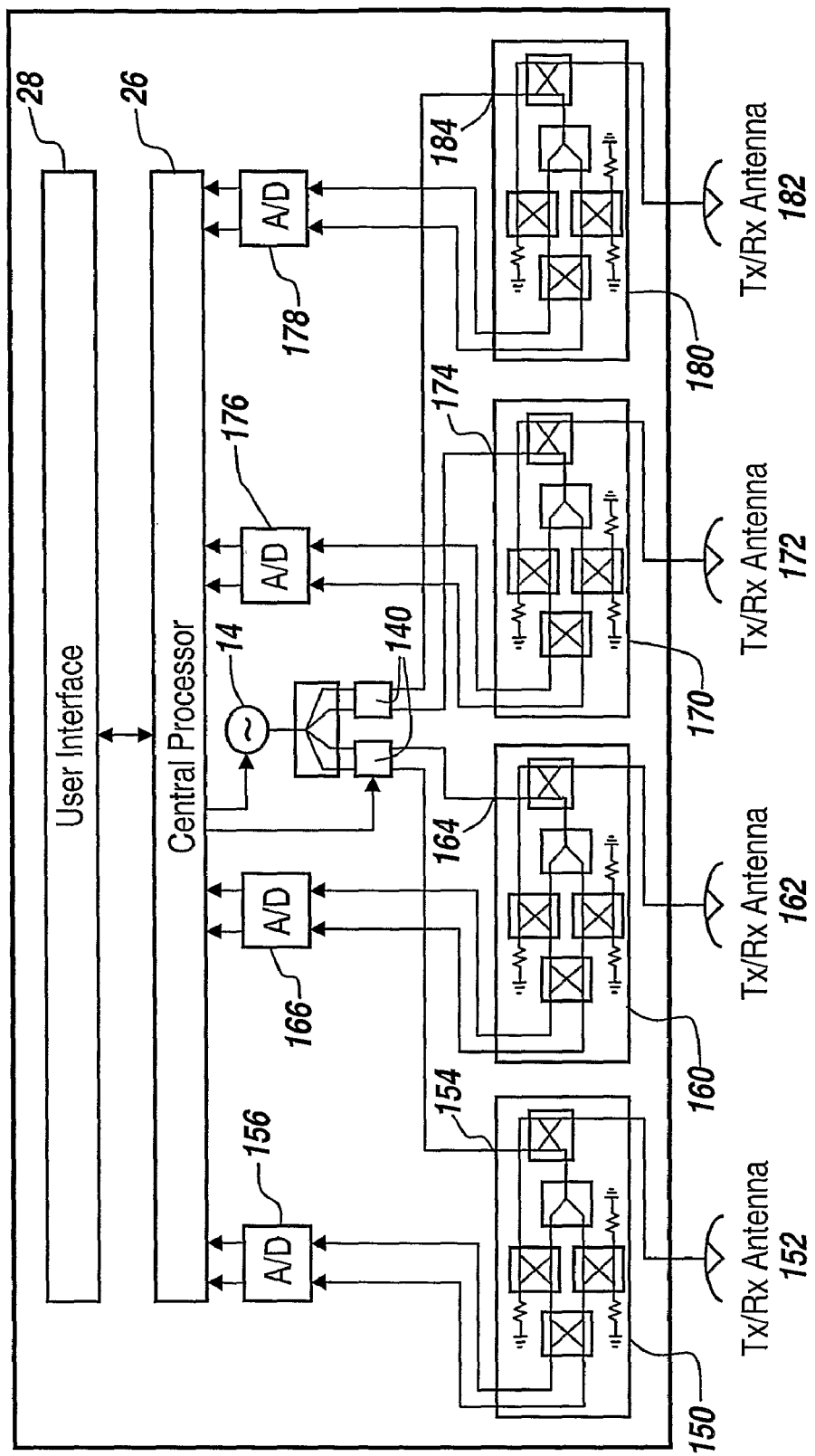
FIG. 3 is a diagrammatic illustration of a multi-element four-port-based radar in which an array of transit/receive antennas, each coupled to its own four-port junction, is used for beam forming in which each multi-port junction has a common signal source and digital phase-shifters interposed between the signal source and respective multi-port junctions for beam-forming purposes; and, FIG. 4 is a flow chart showing an algorithm for determining the distance to objects and selected characteristics of the objects to enable detection of the type of object returning energy, illustrating the use of object templates and a feature database, in which one compares extracted features to a feature database for different objects and one classifies objects and reports the location and angle and range from the radar.

Referring now to FIG. 3, a situation is depicted in which one requires an array of antenna elements and in which one seeks to perform beam forming for the frequency-stepped radar. Here, a single RF source 14 is coupled through digital phase shifters 140 to a plurality of four-port junctions 150, 160, 170 and 180 as illustrated. Four-port junction 150 is coupled to transmit/receive antenna 152, whereas the remainder of the four-port junctions 160, 170 and 180 are coupled to respective transmit/receive antennas 162, 172 and 182.

The configuration of the four-port junctions is identical to that illustrated in FIG. 1.

As can be seen, the RF signal inputs to these four-port junctions for each of the illustrate circuits is respectively illustrated at input ports 154, 164, 174 and 184.

Each of the respective four-port junctions has its own analog-to-digital converter, here illustrated at 156, 166, 176 and 178, with the four-port junctions being of sufficiently small size and cost so that each of the transmit/receive antennas of the array may be provided with its own four-port junction.

Phasing is accomplished through the digital phase shifters, which phase-shift the output of RF signal source 15 to provide for the aforementioned beam forming.

As can be seen from FIG. 1, in the first embodiment of the subject invention, the radar is controlled through a user interface. When the radar is activated by a user, the central processor controls the RF source and sets it to transmit a sinusoid at a frequency $f_1$ defined by the user. This signal is fed to the input of the four-port junction and some energy is coupled out of the antenna, with the rest coupled through the four-port junction to both power detectors.

The signal that gets transmitted out of the antenna propagates through the medium it is directed to. In a ground penetrating radar application, the antenna would be pointed to the ground and the transmit sinusoid would propagate through the ground. At each discontinuity in material, electromagnetic properties, some of this transmitted energy will be reflected, for example, at interfaces between the ground and the air between the soil and a land mine.

A percentage of each transmitted signal is phase shifted and radiated back to the radar antenna and the signal propagates into the four-port junction and is coupled with the RF source signal to the input of each power detector. The two power detectors measure the power of the standing wave as seen at the detector input. This power measurement is taken by scaling and sampling the voltage out of each detector with an analog-to-digital converter. Because the power of the signal does not change in a stationary environment while the RF source is transmitting at a set frequency, the output voltage of each detector is a DC signal. Therefore, the analog-to-digital converter at the detector output does not need to be high speed. The analog-to-digital converter samples each detector output and integrates over a fixed time window to reduce the noise bandwidth. Once these measurements are taken and stored at the central processor, the RF source is stepped to the next frequency ($f_2$) and the process is repeated. This continues until the entire bandwidth defined by the operator has been swept.

Referring to the FIG. 2 embodiment, the circuit is similar to that of FIG. 1 but the RF source power is split. The four-port circuit then operates identically to the circuit of FIG. 1, and power measurements from the four-port junction are measured across the entire frequency band.

As mentioned before, the purpose of this type of circuit that uses a separate transmit and receive antenna is to limit the power that is inputted to the four-port junction, thereby making possible the use of lower-power four-port junctions.

Referring to FIG. 3, each of the four-port junctions functions is as specified in FIG. 1. However, in this case the RF source power is split and phase-shifted to multiple four-port junctions. Each of these circuits then operates identically to the FIG. 1 embodiment except that the detection and classification algorithm change. The phase shifters are controlled by the central processor and are used to form and steer a transmit/receive beam using the antenna array and the four-port circuits. Of course, the shape and size of the array can be varied depending on the application.

Power measurements from each four-port junction are measured across the entire frequency band just as before, but they are also measured at a user-defined set of angles of arrival. The signal processing algorithm in the FIG. 3 embodiment is similar to those employed in FIG. 1, with the exception that in the FIG. 3 embodiment there is an added spatial dimension used for further target discrimination and better classification.

Note that when the antennas are arrayed, they can provide spatial diversity. One other discriminator that can be used is polarization. Using antennas with orthogonal polarization adds an additional set of equations for the same amount of unknowns, improving the probability of detection and reducing the probability of false alarms.

Figure 4:
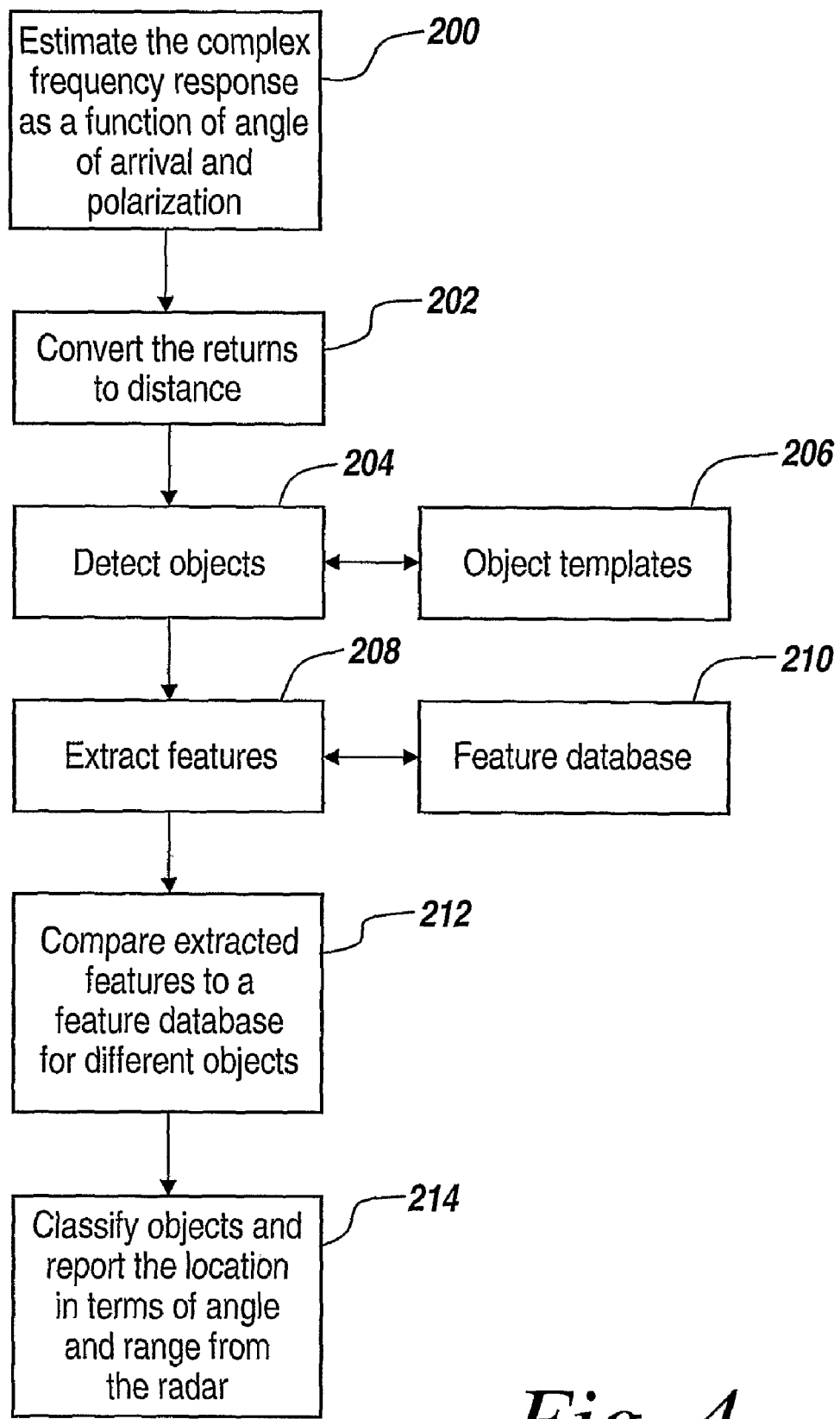

Referring now to FIG. 4, in one embodiment the processing includes first the estimation of the complex frequency response as a function of angle of arrival and polarization is illustrated at 200. As illustrated at 202, one then converts the returns to distance, whereas at 204, one detects objects using object templates that have been previously stored as illustrated at 206.

Having detected objects, one can extract or impose features as illustrated at 208 from a pre-stored feature database 210.

As illustrated at 212, one can compare the extracted features to a feature database for different objects and, as illustrated at 214, one can classify the objects and report the location in terms of angle and range from the radar.

It will be appreciated that the algorithms in the aforementioned Taylor and Niedzwiecki patent applications for respectively the four-port and the six-port junctions can be used to estimate the complex reflection coefficient, with the algorithms used varying between the six-port and the four-port embodiments.

Thereafter, one can use the Taylor Modified Inverse Fourier Transform to convert the frequency domain information into time domain information, thereby eliminating the problems associated with conventional time domain reflectometers and the lack of ability to produce short enough or well-defined enough pulses.

One uses the Taylor algorithms to take into account both phase and attenuation in the transmission medium from the antenna to the object that is reflecting the radiation back. Thus, the subject system takes advantage of the Modified Inverse Fourier Transform to more accurately detect amplitude peaks from which distance or range can be determined and to reject noise or multiple reflections.

Moreover, the Taylor techniques can be invoked to eliminate ghosts, with the use of the complex reflection coefficient also used to eliminate ghosts and false returns, unlike the use of the absolute magnitude of the reflection coefficients of some prior reflectometers.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A radar, comprising:
   a frequency source;
   a multi-port junction having two inputs and a number of outputs, one of said inputs coupled to said frequency source;
   a radar antenna coupled to the other of said input ports;
   a radar processor coupled to said outputs for performing radar functions; and,
   a plurality of said multi-port junctions and antennas, with said antennas being arrayed.

2. The radar of claim 1 wherein said signal source is coupled to each of said plurality of multi-port junctions.

3. The radar of claim 2, and further including phase delays interposed between said signal source and respective multi-port junctions to provide beam steering.

4. The radar of claim 1, and further including a transmit antenna coupled to said signal source, and a power reducing unit coupled between said signal source and said one input to reduce the input signal power thereto.

5. The radar of claim 1, wherein said processor includes an estimator for estimating a complex reflection coefficient from the outputs of said multi-port junction.

6. The radar of claim 5, wherein said processor includes an Inverse Fourier Transform for converting said complex reflection coefficient to distance.

7. The radar of claim 6, wherein said processor includes a detector coupled to the output of said Inverse Fourier Transform to detect objects having characteristics close to object template characteristics.

8. The radar of claim 7, wherein said processor includes a feature extractor coupled to said detector to select those detected objects having features close to pre-selected features.

9. The radar of claim 8, and further including an object classifier for classifying objects based on said detected objects and said selected features and for reporting the location of said classified objects.

10. The radar of claim 9, wherein said reported location includes angle and range from said radar's antenna.

11. The radar of claim 1, wherein the frequency of said frequency source is variable.

12. The radar of claim 1, wherein said frequency source is frequency stepped.

* * * * *